Dec. 25, 1956  C. A. OTTO  2,775,064

TOY MAGNETIC NOVELTY

Filed Oct. 26, 1953

INVENTOR.
Carl A. Otto.
BY Max R. Kraus
Attorney.

2,775,064
Patented Dec. 25, 1956

2,775,064

TOY MAGNETIC NOVELTY

Carl A. Otto, Evanston, Ill., assignor to H. Fishlove & Co., Chicago, Ill., a corporation of Illinois Application October 26, 1953, Serial No. 388,137

2 Claims. (Cl. 46—242)

This invention relates to a magnetic novelty or toy.

One of the objects of this invention is to provide a novelty or toy having magnetic means which are operated for producing an action which is of illusory or mystifying character.

Another object of this invention is to provide a magnetically operated novelty or toy which is operated to produce certain results without apparent cause which is both mystifying and entertaining and which is simple and inexpensive to construct.

Another object of this invention is to provide a toy bird having magnetic means which may be selectively operated to either attract and pick up a simulated worm or the like or to repel or leave said simulated worm unattracted.

Other objects will become apparent as this description progresses.

Figure 1:
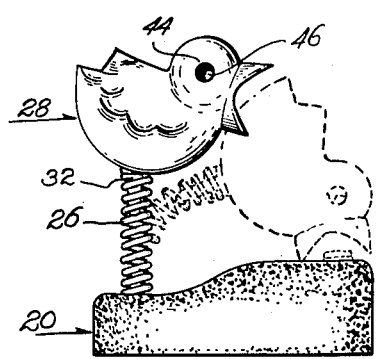
Fig. 1 is a side elevational view of said novelty, showing in dotted lines the operating position of the bird when picking up the worm.
Figure 2:
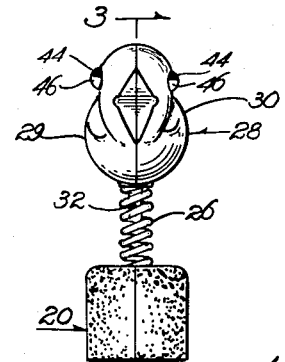
Fig. 2 is a front elevational view of same.

The parts of the invention will now be generally described. The base, generally indicated at 20 is molded of plastic or some similar non-magnetic material and has a curved hollow tubular recess 22 which extends into the body of the base and serves to support the simulated worm subsequently to be described. Secured to the rear of the base as at 24 is a coil spring 26 which extends vertically and which supports a miniature figure such as a bird, generally indicated at 28. The bird is made of plastic or other non-magnetic material and is preferably formed of two longitudinal half sections 29 and 30 joined together to contain therewithin the magnetic element and the means for operating same. The bottom of the bird has an extension 32 which is secured within the top of the coil spring 26, best shown in Fig. 3, and which supports the bird thereon. The coil spring being flexible permits the bird to be moved or positioned forwardly towards the base as best shown in dotted lines in Fig. 1, to perform the function hereinafter to be described.

Figures 6, 7:
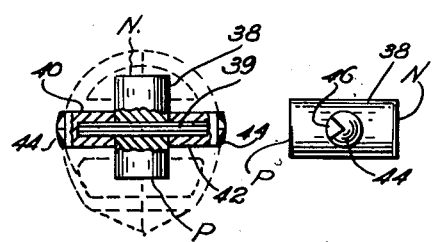
Fig. 6 is an enlarged sectional view of the head and the magnetic element taken on lines 6—6 of Fig. 3.
Fig. 7 is a side elevational view of the magnetic element and of one of the eyes.

The head of the bird is provided with a pair of alined eye openings 34 having inwardly directed sleeves 36. The magnetic means may comprise a permanently magnetized bar 38 well known in the art and which is of cylindrical construction best shown in Figs. 3 and 6. The magnetized bar has the usual positive and negative poles, designated by the letters P and N respectively. A pin 39 extends transversely through said bar and cylindrical members 40 and 42 are secured thereon.

The cylindrical members 40 and 42 form the axle for the magnetic bar 38 and are positioned within the alined eye openings 34 and the sleeves 36. The outer ends of said cylindrical members extend slightly outwardly of the eye openings, are substantially convex and are intended to form simulated eyes 44. The said simulated eyes have a V-shaped portion 46 thereon, best shown in Fig. 7, with the open end of said V pointing in the direction of the positive pole of the magnetic member 38. Any other form of designation may be used to indicate the position of the poles, so that one familiar with the operation of the device may perform it without detection by the observers. The magnetic bar 38 is centrally positioned within the head of the figure and is rotatable within the head of the figure merely by placing the thumb and one of the fingers of one hand over the head and engaging the eyes and applying a slight pressure thereon to rotate the cylindrical bars 40 and 42 and with it the magnetic bar 38. The indicating means 46 designates to the operator the position of the positive and negative poles and thereby enables him to rotate the magnetic element with relation to the front or mouth of the figure dependent on whether he wants the bird to attract and pick up the simulated worm or to repel it and leave it unattracted.

It will be seen that the beak or mouth of the bird is shown in a simulated open position, however there is a wall in the front of said bird so that there is no opening therein.

Figure 3:
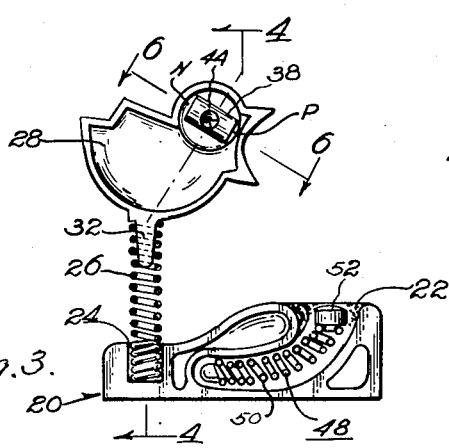
Fig. 3 is a detail view taken on lines 3—3 of Fig. 2.
Figure 4:
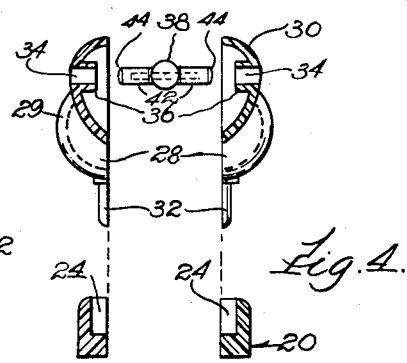
Fig. 4 is an exploded detail sectional view taken on lines 4—4 of Fig. 3.
Figure 5:
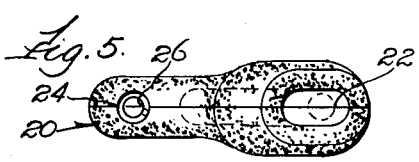
Fig. 5 is a top plan view of the base.

The simulated worm generally designated by the numeral 48 is formed of a thin coil spring 50 and one end of said spring has secured thereto a permanently magnetized element 52 with the negative pole thereof extending outwardly. If desired, the opposite end of the coil spring may likewise support a magnet. To carry out the simulated worm effect a covering of a thin material may enclose the coil spring. The simulated worm is positioned in the recess 22 of the base as best shown in Fig. 3 and is preferably positioned so that the magnetic element 52 is confined within the recess 22 adjacent the top of the recess. However, the simulated worm may be positioned so that the simulated worm extends slightly upwardly of the opening.

The purpose of the novelty or toy is to provide one that will mystify the observer. In other words, anyone not familiar with the operation of same will not understand what makes it perform the functions that it does. For example, the toy is operated in the following manner. With the simulated worm in the base as shown in Fig. 3, the bird is manually engaged as previously described and moved forwardly and downwardly against the tension of the coil spring as shown in dotted lines in Fig. 1. If the magnetic element 38 inside the head of the bird is positioned with the positive pole adjacent the mouth of the bird then the positive pole will magnetically attract the magnet 52 and the simulated worm will be drawn up out of the recess 22 and will adhere to the mouth of the bird and when the hand is removed from the bird, the coil spring 26 will straighten vertically and support the bird in an upright position with the simulated worm hanging from the mouth of the bird. However, if the negative pole of the magnetic element 38 is positioned adjacent the mouth of the bird then obviously there will be no magnetic attraction and the negative pole of magnetic element 38 will repel the negative pole of magnetic element 52 and the simulated worm will not adhere to the beak of the bird and the worm will remain in the base. Anyone not familiar with the operation of the toy will be mystified as to what causes the worm to come up at certain times and to remain in the base at other times. The magnetic element 38 may be rotated without detection since the hand is positioned over the bird and the thumb and one of the fingers engages the eyes in a natural position.

Figures 8, 9:
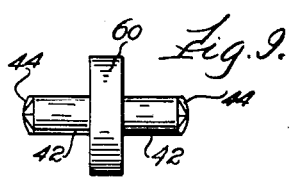
Fig. 8 is a side elevational view of another form of magnetic element.
Fig. 9 is a front elevational view of the magnetic element and its support shown in Fig. 8.
Figure 10:
Fig. 10 is an elevational view of the simulated worm.

Figs. 8 and 9 show a modified form of magnetic element and same comprises a magnetized disc 50 in place of the magnetic bar 38. The disc is supported similarly to the bar and has a positive and negative pole and operates in the same manner previously described.

The toy is highly amusing and entertaining and is particularly mystifying to those not familiar with its operation.

It will be understood that various changes and modifications may be made from the foregoing without departing from the spirit and scope of the appended claims.

I claim:

1. In a toy magnetic novelty comprising a base, a simulated bird having a beak and a pair of rotatable eyes, resilient means between said base and bird for supporting said bird, a magnet supported inside said bird on an axis extending between said eyes adjacent the beak, and operably connected to said eyes, indicating means on said eyes for indicating the position of one of the magnetic poles of said magnet, a simulated worm having a second magnet in at least one end positioned on said base, said eyes adapted to be manually engaged for rotating said first mentioned magnet so that when the beak of said bird is positioned adjacent the magnet of said simulated worm the simulated worm will be caused to adhere to said beak and when said first mentioned magnet is further rotated the magnetic attraction between said magnets will be so modified that said simulated worm will not adhere to said beak.

2. In a toy magnetic novelty comprising a base, a simulated bird having a beak and a pair of rotatable eyes, resilient means between said base and bird for supporting said bird, a magnet supported inside said bird on an axis extending between said eyes adjacent the beak, and operably connected to said eyes, a simulated worm having a second magnet in at least one end positioned on said base, said eyes adapted to be manually engaged for rotating said first mentioned magnet so that when the beak of said bird is positioned adjacent the magnet of said simulated worm the simulated worm will be caused to adhere to said beak and when said first mentioned magnet is further rotated the magnetic attraction between said magnet will be so modified that said simulated worm will not adhere to said beak.

References Cited in the file of this patent

UNITED STATES PATENTS

| | | |
|---|---|---|
| 1,446,835 | Cook | Feb. 27, 1923 |
| 2,249,454 | Brake | July 15, 1941 |
| 2,277,672 | Stone | Mar. 31, 1942 |
| 2,458,970 | Wilson | Jan. 11, 1949 |
| 2,622,366 | Abplanalp | Dec. 23, 1952 |
| 2,648,157 | Wilson et al. | Aug. 11, 1953 |
| 2,663,967 | Mathis | Dec. 29, 1953 |